United States Patent
John et al.

(10) Patent No.: US 9,774,825 B1
(45) Date of Patent: Sep. 26, 2017

(54) AUTOMATIC EXPANSION AND DERIVATIVE TAGGING

(71) Applicant: Avaya Inc., Santa Clara, CA (US)

(72) Inventors: Ajita John, Holmdel, NJ (US); Seamus Hayes, Galway (IE); John Rix, Galway (IE); Adrian Ryan, Galway (IE); Samuel Fisher, Greenville, SC (US); David Skiba, Golden, CO (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 15/077,720

(22) Filed: Mar. 22, 2016

(51) Int. Cl.
*H04N 7/15* (2006.01)
*H04L 29/06* (2006.01)
*H04L 12/18* (2006.01)

(52) U.S. Cl.
CPC ......... *H04N 7/155* (2013.01); *H04L 12/1831* (2013.01); *H04L 65/605* (2013.01)

(58) Field of Classification Search
CPC .................................................. H04L 12/1831
See application file for complete search history.

(56) References Cited

U.S. PATENT DOCUMENTS

| | | | |
|---|---|---|---|
| 7,945,653 | B2 | 5/2011 | Zuckerberg et al. |
| 8,379,819 | B2 | 2/2013 | Diskin et al. |
| 8,391,455 | B2 | 3/2013 | John et al. |
| 8,849,879 | B2 | 9/2014 | John et al. |
| 2011/0225013 | A1 | 9/2011 | Chavez et al. |
| 2012/0030368 | A1 | 2/2012 | John et al. |
| 2012/0072845 | A1* | 3/2012 | John ................. G06F 17/30038 715/738 |
| 2014/0081643 | A1 | 3/2014 | John et al. |
| 2014/0082100 | A1 | 3/2014 | Sammon et al. |

FOREIGN PATENT DOCUMENTS

EP 1811759 7/2007

* cited by examiner

*Primary Examiner* — Creighton Smith
(74) *Attorney, Agent, or Firm* — Sheridan Ross P.C.

(57) ABSTRACT

Methods and systems are provided for automatically generating expanded and derivative tags associated with digital content. The methods and systems provide multi-dimensional, layered tagging with stored audio/video conference contents, creating relationships and a tag network between links and nodes in a communication system.

20 Claims, 8 Drawing Sheets

US 9,774,825 B1

AUTOMATIC EXPANSION AND DERIVATIVE TAGGING

FIELD

The present disclosure is generally directed to multi-party communications, in particular, toward conferences established between communication devices of users.

BACKGROUND

Conferencing, and in particular web-conferencing, includes a range of communication services. These communication services can include, meetings, seminars, educational broadcasts, collaborative communication sessions, and/or other communications that are established between communication devices across a network. Given the sheer number of communications involved and information exchanged in conferencing, organizing and managing the data associated with multi-party communication sessions can be a cumbersome and tedious manual task.

DETAILED DESCRIPTION

Figure 1:
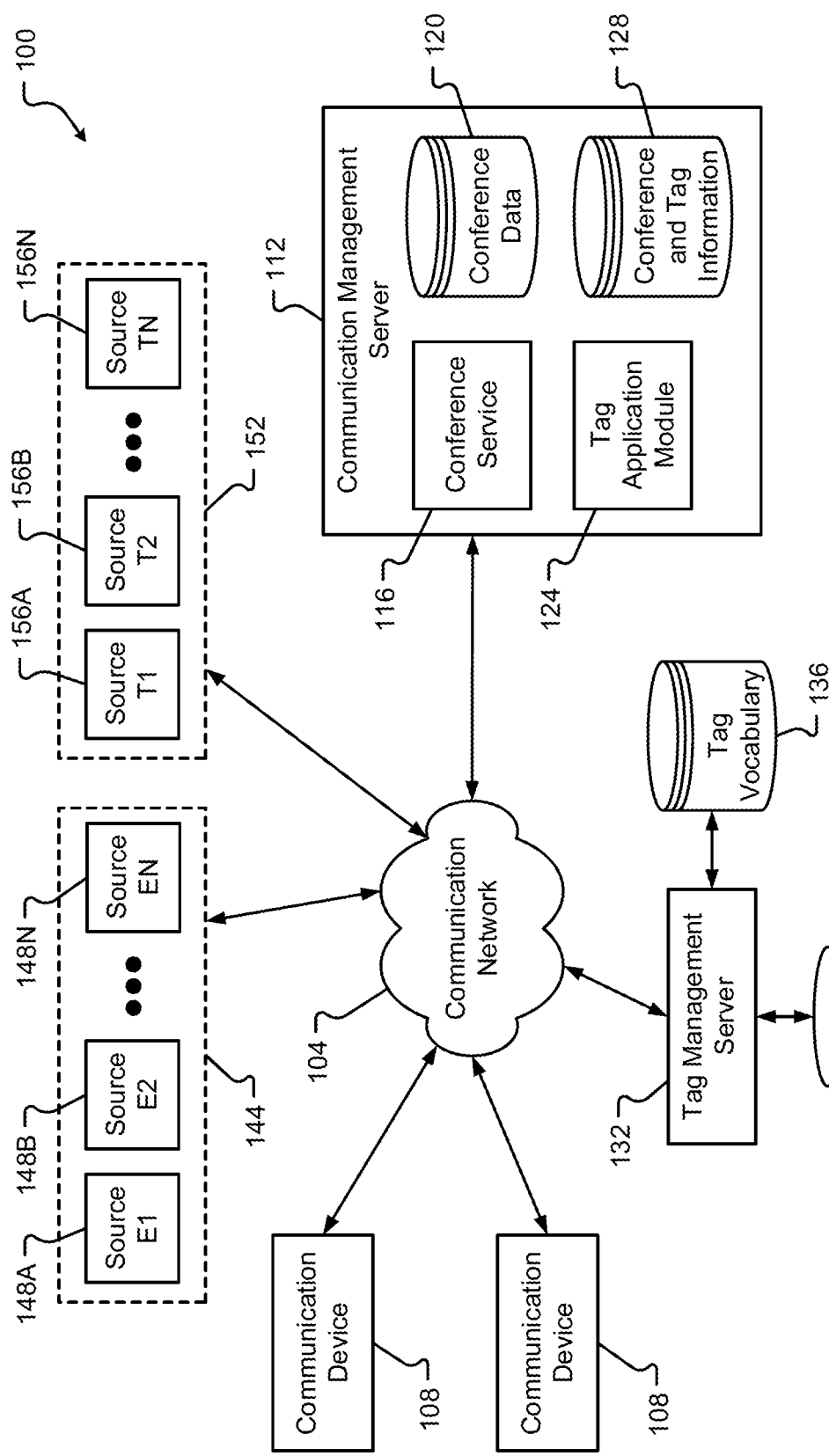
FIG. 1 depicts a block diagram of a communication system in accordance with at least some embodiments of the present disclosure.

Embodiments of the present disclosure will be described in connection with the execution of a communication management system. The communication management system may be configured to manage communications between one or more communication devices. In some cases, the system may establish multi-party meetings, or conferences, between multiple communication devices across a communication network. Conferences include information relating to the conference itself, participants involved, participants invited, relationships of participants to one another, relationships of participants in an organization, topics scheduled, topics discussed, action items, media uploaded, and/or other information.

Tags have been used to mark digital content in an effort to locate specific content for later review, reference, and to be addressed at a later date. Today, tagging is used in audio/video conference calls to identify people, categories, and/or other important data that can be used as reference points.

Tagging, unfortunately, has some of the same limitations as the audio/video conference itself. While tags make it easier to find the reference points, the audio/video conference participants still have to manually mark and create associations for follow-up.

Embodiments of the present disclosure solves these and other issues by providing automatic expansion and derivative tags for audio/video conferences. These tags may be used to generate or create a tag network. Expansion tags and derivative tags can be triggered automatically and provide multi-dimensional, layered tagging with stored audio/video conference contents, creating relationships between audio/video conferences.

Tagging may be performed manually, automatically, and/or combinations thereof. In one embodiment, the tagging may be used in advanced audio coding ("AAC") to allow recordings to be searched and enable the retrieval of recordings pertinent to a search query.

In some embodiments, the problems of conventional tagging are solved by the systems and methods described herein. For instance, the present disclosure automatically expands tags and provides derivative tags that can be used to create a tag network for audio/video conferences. When tags are automatically expanded and derivative tags are provided, audio/video conferences become multi-dimensional. The tag expansion and derivation provide a rich network of references and relationships. In addition to tags, which label points/spans in time, sets of other tags, and/or concepts expressed during a conference, a new set of tags can be provided automatically, which can lead to additional, complex tagging.

For example, "factory production in China" might initiate a scan and detection of other commonly related tags from previous meetings. The systems and methods described herein can automatically tag derivatives like "environment" and "pollution" as well as create a derivative network of meeting references. The network may be composed of tags that include people's names, locations, keywords, associated topics, etc.

Tags may refer to objects, or entities, such as people, locations, technologies, and projects. The references can enable a tag network to be built where an entity tag may be connected to several tags that refer to the entity. The entity tag may also have a hierarchical and/or composite structure. For instance, a location tag may consist of several building tags, each of which may contain several room tags. An organization tag may contain department tags which may contain people tags. Entity tags can be linked to user contributions and automatic tags can be attached to content such as audio, video, digital and other reference material. Additionally or alternatively, tags may refer to, or be associated with, other objects such as products, events, timing, phrases, groups, etc.

In some embodiments, the tag network can allow inference of relationships between content and entities. For example, the tag network may enable a way to determine how a similar a set of recordings is to another set of recordings by the number of entity tags in common or the shortest distance between the recordings in the tag network. Similarities between entity tags may be inferred by the number of common recordings to which they refer.

A number of methods may be used to facilitate tag expansion. For instance, tag expansion may include the use of one or more ontologies to expand tags. In some embodiments, the ontology may define a category and/or a nature of a tag or object. Whether used in reference to a tag or object, the ontology can include, but is in no way limited to, alternative meanings, relationships, context of use, an existence of the object or tag in a particular context or environment, and/or other expanded information relating to the object or tag. In one embodiment, standard language ontologies may be used to expand commonly used terms with their components (e.g., tagging part of a conversation with "airline" may expand to include "airport, travel, flights, luggage, etc."). In one embodiment, domain, company, or entity-specific ontologies may be used to expand based on the specifics of the business (e.g., tagging part of a conversation with "Avaya Call Center Product" may expand to include related or complementary products/features like "AACC, IC, EMC, etc."). In one embodiment, tag expansion may be performed based on entity/company/domain structure and relationships (e.g., a conference tagged with "summer promotion" might be expanded to include "marketing and sales" which might further be expanded to include specific regional teams).

In some embodiments, the tag expansion may include the repetitive discovery of derivative information via recursive tag expansion. For instance, once a tag is expanded to include one or more expanded tags, the expanded tags may be further expanded by continuing to apply the tag expansion methods disclosed herein to further expand the expanded tags. In one embodiment, an initial tag may be expanded to yield a first set of expanded tags. The first set of expanded tags may then be expanded to yield a second set of expanded tags. This second set of expanded tags may appear unrelated to the initial tag but the second set of expanded tags are directly related to the first set of expanded tags, and as such, may define a relationship (e.g., in a tag network, etc.) to the initial tag as well as the first set of expanded tags. In one embodiment, the second set of expanded tags may be further expanded to produce a third set of expanded tags. It is anticipated that this recursive tag expansion may continue any number of times. In some cases, the number of times or recursive iterations may be limited based on one or more of results generated, administrative settings, number of expanded tags generated at each iteration (e.g., when too few, too many, above or below a threshold, etc.), predetermined iteration number, etc.

It is an aspect of the present disclosure that external systems may be accessed to expand tags. For instance, the tag expansion may rely on systems other than the recordings (e.g., meeting, conference, digital media, etc.), or content of the recordings, to facilitate the expansion. For example, the tag "Follow up on printing report, John" may involve expanding John to a complete name (first name, last name). This expansion may be based on a meeting invitation sent from a personal information manager, email client, and/or scheduler (e.g., an invitation sent from Microsoft® Outlook, etc.). The tag expansion may then involve a lookup into an enterprise directory to get information for John such as his email, location, organization etc. A lookup for the organization may provide organizational context such as who is John's supervisor, what is John's role at the organization, and/or other entity-specific information. Additionally or alternatively, a lookup for a location tag may cause the system described herein to access a map provider (such as Google Maps, etc.) to provide location context. As can be appreciated, the tag "Follow up on printing report, John" can be expanded using the methods and systems described herein to expand the tag into a network of tags. This network of tags, among other things, can be used to send an email reminder to John and/or a copy of the email reminder to John's supervisor. The location context may also be used to show John local services that he commonly uses and the state of the local services (e.g., printing/copying and available/down/busy).

The scenario described above shows that a conversation/meeting can be integrated with other systems through a tag network that enables people to be productive through tasks automatically entered into a calendar and team collaboration spaces, reminders being sent to actors who were not directly associated with the original tag, and integration with services (location, commercial services) to assist a user.

In some embodiments, the tag expansion methods may lookup enterprise directories, email servers, Google Maps, social networks, and/or other applications through various application programming interfaces ("APIs"). This approach makes the tag expansion and derivation methods and systems described herein a feature rich experience and not just looking at the tags that are (1) contributed by users, or (2) extracted from the content of conversations. As can be appreciated, the methods and systems described herein provide richer tag context as well as enabling applications to do more with an expanded tag network. Additionally or alternatively, the extent of how much a tag is, or can be, expanded may also be configured by the needs of a consuming application.

Embodiments include a communication system, comprising: a server, comprising: a microprocessor; a computer readable medium, coupled to the microprocessor and comprising instructions stored thereon that cause the microprocessor to: determine that a tag is associated with digital media content; determine a definition of the tag including a type and meaning of the tag; select, from a repository of expanded tag definitions and using the definition of the tag, an expanded tag definition for the tag comprising information for expanding search criteria related to the tag or the digital media content; and associating the expanded tag definition with the tag and the digital media content.

Aspects of the above communication system include a network interface that enables the microprocessor to present the expanded tag definition to a communication device in the communication system. Aspects of the above communication system include wherein the tag identifies information relevant to the digital media content at particular time of the digital media content. Aspects of the above communication system include wherein the particular time of the digital media content is a particular time of a presentation of the digital media content. Aspects of the above communication system include wherein the microprocessor receives expanded tag definitions from a tag expansion data source via a database interface that is communicatively coupled with the server. Aspects of the above communication system include wherein the tag expansion data source is an organization-internal data source owned and managed by an organization providing the digital media content and comprises private data that is unavailable to entities outside of the organization. Aspects of the above communication system include wherein the tag expansion data source is an organization-external data source owned and managed by an entity other than an organization providing the digital media content and comprises public data that is available to devices inside and outside of the organization. Aspects of the above communication system include wherein the tag expansion data source is one or more of an organization-specific member list, an organization-specific email client, an organization-specific calendar, or a private vocabulary repository hosted by the organization. Aspects of the above communication system include wherein the tag expansion data source is one or more of a social network site, a search engine site, a geographical map site, or a public website. Aspects of the above communication system include wherein determining the definition of the tag further causes the microprocessor to: select a particular expansion ontology from a group of expansion ontologies stored in a memory, wherein the group of expansion ontologies comprises two or more of a content-based ontology, an entity-specific ontology, or a domain structure ontology, wherein the content-based ontology includes instruction sets that cause the microprocessor to access a stored vocabulary database of commonly-used words associated with the tag, wherein the entity-specific ontology includes instruction sets that cause the microprocessor to access a stored entity-specific relational database of commonly-used words that are associated with the tag and related to a particular entity or company, wherein the domain structure ontology includes instruction sets that cause the microprocessor to access a stored domain relationship structure ontology database of words that define relationships between entities in a private domain and the tag; analyze information about the tag based on the selected expansion ontology; and generate the type and meaning of the tag based on the analysis of the information about the tag.

Embodiments include a method, comprising: receiving, at a processor, a tag associated with digital media content; determining, via the processor, a definition of the tag including a type and meaning of the tag; selecting, via the processor and using the definition of the tag, an expanded tag definition for the tag from a repository of expanded tag definitions, wherein the expanded tag definition comprises information for expanding search criteria related to the tag or the digital media content; and associating, via the processor, the expanded tag definition with one or more of the tag or the digital media content.

Aspects of the above method include wherein the tag identifies information relevant to the digital media content at particular time of the digital media content. Aspects of the above method include wherein the particular time of the digital media content is a particular time of a presentation of the digital media content. Aspects of the above method include determining, via the processor, to further expand the tag by expanding the expanded tag definition; selecting, via the processor and using the expanded tag definition, a derivative expanded tag definition for the expanded tag definition from the repository of expanded tag definitions, wherein the derivative expanded tag definition comprises information for expanding search criteria related to one or more of the tag, the expanded tag definition, or the digital media content; and associating, via the processor, the derivative expanded tag definition with one or more of the tag, the expanded tag definition, or the digital media content. Aspects of the above method include wherein the expanded tag definition comprises at least one expanded tag. Aspects of the above method include, prior to selecting the expanded tag definition, receiving, via the processor, the expanded tag definitions from a tag expansion data source across a communication network. Aspects of the above method include generating, via the processor, a tag network based on the tag and the expanded tag, wherein the tag network defines a relationship between the tag, the expanded tag, and one or more of other tags, the digital media content, or other digital media content, and wherein the tag network is configured for rendering as a graphical user interface to a display of a communication device. Aspects of the above method include wherein the graphical user interface presents the relationship between the tag, the expanded tag, and one or more of other tags, the digital media content, or other digital media content as one or more graphical links between nodes. Aspects of the above method include wherein the tag expansion data source is an organization-internal data source owned and managed by an organization providing the digital media content and comprises private data that is unavailable to entities outside of the organization. Aspects of the above method include wherein the tag expansion data source is an organization-external data source owned and managed by an entity other than an organization providing the digital media content and comprises public data that is available to devices inside and outside of the organization. Aspects of the above method include wherein the tag expansion data source is one or more of an organization-specific member list, an organization-specific email client, an organization-specific calendar, or a private vocabulary repository hosted by the organization. Aspects of the above method include wherein the tag expansion data source is one or more of a social network site, a search engine site, a geographical map site, or a public website. Aspects of the above method include wherein determining the definition of the tag comprises selecting, via the processor, a particular expansion ontology from a group of expansion ontologies stored in a memory, wherein the group of expansion ontologies comprises two or more of a content-based ontology, an entity-specific ontology, or a domain structure ontology, wherein the content-based ontology includes instruction sets that cause the processor to access a stored vocabulary database of commonly-used words associated with the tag, wherein the entity-specific ontology includes instruction sets that cause the processor to access a stored entity-specific relational database of commonly-used words that are associated with the tag and related to a particular entity or company, wherein the domain structure ontology includes instruction sets that cause the processor to access a stored domain relationship structure ontology database of words that define relationships between entities in a private domain and the tag; analyzing, via the processor, information about the tag based on the selected expansion ontology; and generating, via the processor, the type and meaning of the tag based on the analysis of the information about the tag.

Embodiments include a server, comprising: a processor; and a computer-readable medium, coupled with the processor, the computer-readable medium comprising instruction sets that are executable by the processor, wherein the instruction sets cause the processor to: analyze digital media content for tag information; determine a tag is generated for a portion of the digital media content, wherein the tag comprises information relevant to a recorded content time of the digital media content; automatically determine a definition of the tag, wherein the definition includes a type and meaning of the tag; select, automatically from a set of expanded tags received from an expanded tag data source and using the definition of the tag, an expanded tag comprising an expanded definition for the tag, wherein the expanded tag definition comprises information for expanding search criteria related to the tag or the digital media content; and associate the expanded tag with the tag and the digital media content by storing the expanded tag, a representation of the expanded tag, and/or a pointer to the expanded tag with the tag and the digital media content.

Aspects of the above server include wherein automatically determining the definition of the tag further causes the processor to: select a particular expansion ontology from a group of expansion ontologies stored in a memory, wherein the group of expansion ontologies comprises two or more of a content-based ontology, an entity-specific ontology, or a domain structure ontology, wherein the content-based ontology includes instruction sets that cause the processor to access a stored vocabulary database of commonly-used words associated with the tag, wherein the entity-specific ontology includes instruction sets that cause the processor to access a stored entity-specific relational database of commonly-used words that are associated with the tag and related to a particular entity or company, wherein the domain structure ontology includes instruction sets that cause the processor to access a stored domain relationship structure ontology database of words that define relationships between entities in a private domain and the tag; analyze information about the tag based on the selected expansion ontology; and generate the type and meaning of the tag based on the analysis of the information about the tag.

Referring to FIG. 1, a block diagram of a communication system 100 is shown in accordance with at least some embodiments of the present disclosure. The communication system 100 of FIG. 1 may be a distributed system and, in some embodiments, comprises a communication network 104 connecting communication devices 108 with a communication management server 112. The communication system 100 may include, but is not limited to, a tag management server 132 and a number of data sources 144, 152. In one embodiment, communication devices 108 may be communicatively connected to a conference service 116 of the communication management server 112. For example, the conference service 116 may provide multi-party calls, web-based conferencing, web-based seminar ("webinar"), and/or other audio/video communication services. In any event, the multi-party calls can include two, three, four, or more communication devices 108 that access the conference service 116 via a communication network 104.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Voice over Internet Protocol (VoIP) network, a Session Initiation Protocol (SIP) network, a cellular network, and any other type of packet-switched or circuit-switched network known in the art. In addition, it can be appreciated that the communication network 104 need not be limited to any one network type, and instead may be comprised of a number of different networks and/or network types. The communication network 104 may comprise a number of different communication media such as coaxial cable, copper cable/wire, fiber-optic cable, antennas for transmitting/receiving wireless messages, and combinations thereof.

The communication devices 108 may correspond to at least one of a smart phone, tablet, personal computer, and/or some other computing device. Each communication device 108 may be configured with an operating system ("OS") and at least one communication application. The communication application may be configured to exchange communications between the communication device 108 and another entity (e.g., a communication management server 112, another communication device 108, etc.) across the communication network 104. Additionally or alternatively, communications may be sent and/or received via the communication device 108 as a telephone call, a packet or collection of packets (e.g., IP packets transmitted over an IP network), an email message, an instant message ("IM"), an SMS message, an MIMS message, a chat, and/or combinations thereof. In some embodiments, the communication device 108 may be associated with one or more users in the communication system 100.

The communication management server 112 may include hardware and/or software resources that, among other things, provides the ability to hold multi-party calls, conference calls, and/or other collaborative communications. The communication management server 112 may include a conference service 112, conference data memory 120, a tag application module 124, and conference and tag information memory 128 to name a few.

In some embodiments, the conferencing service 116 may be included in the communication management server 112 and/or as a separate service or system of components apart from the communication management server 112 in the communication system 100. In any event, the conferencing service 116 provides conferencing resources that can allow two or more communication devices 108 to participate in a multi-party call. One example of a multi-party call includes, but is not limited to, a person-to-person call, a conference call between two or more users/parties, webinars, collaborative meetings, and the like. Although some embodiments of the present disclosure are discussed in connection with multi-party calls, embodiments of the present disclosure are not so limited. Specifically, the embodiments disclosed herein may be applied to one or more of audio, video, multimedia, conference calls, web conferences, and the like.

In some embodiments, the conferencing service 116 can include one or more resources such as conference mixers and other conferencing infrastructure. As can be appreciated, the resources of the conferencing service 116 may depend on the type of multi-party call provided by the conferencing service 116. Among other things, the conferencing service 116 may be configured to provide conferencing of at least one media type between any number of participants. The conference mixer of the conferencing service 116 may be assigned to a particular multi-party call for a predetermined amount of time. In one embodiment, the conference mixer may be configured to negotiate codecs with each communication device 108 participating in a multi-party call. Additionally or alternatively, the conference mixer may be configured to receive inputs (at least including audio inputs) from each participating communication device 108 and mix the received inputs into a combined signal which can be monitored and/or analyzed by the communication management server 112 and/or a tag management server 132.

The conference data memory 120 may include presentations, slides, documents, participant information, uploaded information, participant information, invitation information, and/or other information accessed by the conferencing service 116 and/or the communication management server 112. For instance, a meeting host may upload a presentation and/or other digital files to the conference data memory 120 of the server 116 prior to, or during, a meeting. Continuing this example, the host may access the one or more files contained in the memory 120 for presentation to an audio/video output of one or more communication devices 108 of other participants in the conference.

In some embodiments, the communication management server 112 may include a tag application module 124. The tag application module 124 may analyze conference information to derive and/or generate tags. This generation may include the automatic generation of tags based on information associated with the conference. In one embodiment, the tag application module 124 may provide an application programming interface for a tag management server 132 to analyze the conference information and/or generate tags. It is an aspect of the present disclosure that the tag application module 124 and/or the tag management server 132 can store generated tags in the conference and tag information memory 128.

The tag management server 132 may be used to monitor and/or analyze conference information associated with the communications of conferences, digital media, participants, etc. In some embodiments, the tag management server 132 may perform the methods as described herein and in conjunction with FIGS. 1-9. For instance, the tag management server 132 may analyze audio and/or video content associated with a conference. Additionally or alternatively, the tag management server 132 may analyze information associated with conference participants, locations, organizers, invitees, topics, schedules, other conferences, and/or other information. The tag management server 132 may refer to one or more sources 136, 144, 152 for information in expanding generated tags (e.g., tags associated with the objects described above, etc.). These sources 136, 144, 152 may include a tag vocabulary 136 (e.g., language ontology, etc.), organization-external sources 144 (e.g., sources external to an organization holding the conference, etc.), and/or organization-internal sources 152, such as domain, company or entity-specific sources (e.g., those information sources available to an organization and not available to the public, or entities outside of the organization, etc.). The organization-external sources 144 may correspond to a number of different sources 148A-N, such as a social network site (e.g., Facebook®, LinkedIn®, etc.) a data site (e.g., Google Maps, Google, Yahoo, search engines, etc.), an external organization, and/or some other site that is external to an organization associated with the conference. The organization-internal sources 152 may correspond to a number of different sources 156A-N, such as a company database, an organizational structure, an address source, a calendar source, and/or some other source of information that is internal (e.g., private, not public, etc.) to an organization associated with the conference. Analyzed and/or expanded tags may be stored in a managed tags memory 140. The managed tags memory 140 may be accessed by one or more communication devices 108, servers 112, and/or other entities. This access may be protected or governed by one or more permission, authorization, and/or authentication protocols.

Figure 2:
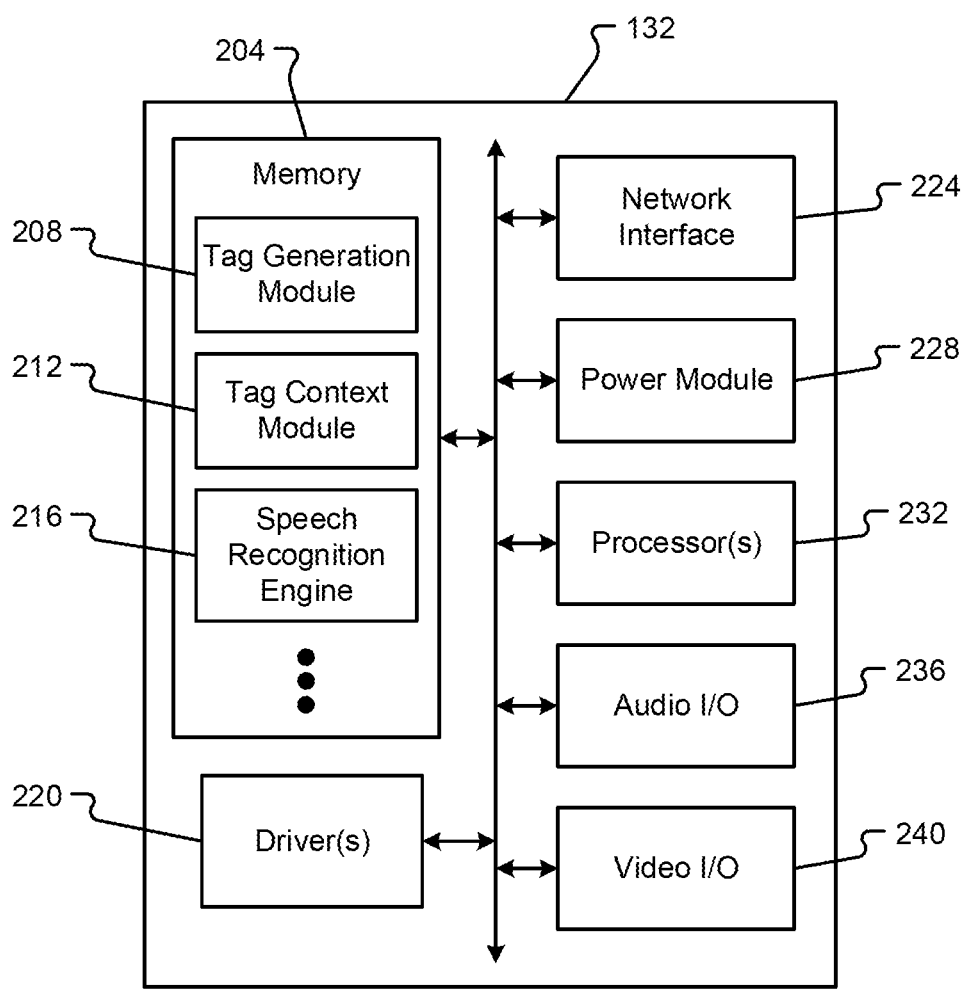
FIG. 2 is a block diagram depicting components of a server used in a communication system in accordance with at least some embodiments of the present disclosure.

FIG. 2 is a block diagram depicting components of a server 112, or a tag management server 132, used in the communication system 100 in accordance with at least some embodiments of the present disclosure. The tag management server 132 is shown to include a computer memory 204 that stores one or more instruction sets, applications, or modules, potentially in the form of a tag generation module 208, a tag context module 212, and/or a speech recognition engine 216. Although not shown, the tag management server 132 may further include other components of the various servers depicted in FIG. 1 including, without limitation, the communication management server 112. In other words, the tag management server 132 may be configured as a server, or part of a server, that includes any or all of the components of the communication system 100 depicted in FIG. 1. The tag management server 132 is also shown to include one or more drivers 220, a network interface 224, a power module 228, a processor 232, an audio input/output ("I/O"), and a video I/O.

The memory 204 may correspond to any type of non-transitory computer-readable medium. In some embodiments, the memory 204 may comprise volatile or non-volatile memory and a controller for the same. Non-limiting examples of memory 204 that may be utilized in the tag management server 132 include RAM, ROM, buffer memory, flash memory, solid-state memory, or variants thereof. Any of these memory types may be considered non-transitory computer memory devices even though the data stored thereby can be changed one or more times.

The applications/instructions 208, 212, 216 may correspond to any type of computer-readable instructions or files storable in the memory 204. The functionality of the tag generation module 208, tag context module 212, and/or the speech recognition engine 216, may be similar or identical to the functionality provided by the tag application module 124. The tag generation module 208 may receive information from the communication management server 112 and analyze the information for tag data, objects, and/or tag generation data. In some embodiments, the tag generation module 208 may communicate with one or more sources 136, 144, 152 via the network interface 224 of the tag management server 132 to generate tags or expanded tags. In one embodiment, the tag generation module 208 may operate with the speech recognition engine 216 to detect differences and/or similarities in audio content. For instance, the speech recognition engine 216 may monitor and/or analyze audio information for keywords, phrases, names, spoken information, and/or other audible information. This information may then be analyzed by the tag generation module 208 to determine whether a tag should be generated or expanded. In some cases, the tag generation module 208 may refer to a tag vocabulary memory 136 containing known expansion terms for generating an expanded tag. The tag context module 212 may analyze contextual information about tags and/or objects of a conference. For instance, the tag context module 212 may analyze information associated with a tag and/or object to determine whether a tag should be expanded or derived from the information received by the tag management server 132. Context, in this sense, may correspond to the time of the tag, location of meeting, associated communication devices 108, participants, organizational members, invitation time, etc.

The driver(s) 220 may correspond to hardware, software, and/or controllers that provide specific instructions to hardware components of the tag management server 132, thereby facilitating their operation. For instance, the network interface 224, power module 228, audio I/O 236, video I/O 240, and/or memory 204 may each have a dedicated driver 220 that provides appropriate control signals to effect their operation. The driver(s) 220 may also comprise the software or logic circuits that ensure the various hardware components are controlled appropriately and in accordance with desired protocols. For instance, the driver 220 of the network interface 224 may be adapted to ensure that the network interface 224 follows the appropriate network communication protocols (e.g., TCP/IP (at one or more layers in the OSI model), TCP, UDP, RTP, GSM, LTE, Wi-Fi, etc.) such that the network interface 224 can exchange communications via the communication network 104. As can be appreciated, the driver(s) 220 may also be configured to control wired hardware components (e.g., a USB driver, an Ethernet driver, fiber optic communications, etc.).

The network interface 224 may comprise hardware that facilitates communications with other communication devices over the communication network 104. As mentioned above, the network interface 224 may include an Ethernet port, a Wi-Fi card, a Network Interface Card (NIC), a cellular interface (e.g., antenna, filters, and associated circuitry), or the like. The network interface 224 may be configured to facilitate a connection between the tag management server 132 and the communication network 104 and may further be configured to encode and decode communications (e.g., packets) according to a protocol utilized by the communication network 104.

The power module 228 may include a built-in power supply (e.g., battery) and/or a power converter that facilitates the conversion of externally-supplied AC power into DC power that is used to power the various components of the tag management server 132. In some embodiments, the power module 228 may also include some implementation of surge protection circuitry to protect the components of the tag management server 132, or associated server, from power surges.

The processor 232 may correspond to one or many microprocessors that are contained within a common housing, circuit board, or blade with the memory 204. The processor 232 may be a multipurpose, programmable device that accepts digital data as input, processes the digital data according to instructions stored in its internal memory, and provides results as output. The processor 232 may implement sequential digital logic as it has internal memory. As with most microprocessors, the processor 232 may operate on numbers and symbols represented in the binary numeral system.

The audio I/O interface 236 can be included to receive and transmit audio information signals between the various components of the system 100. By way of example, the audio I/O interface 236 may comprise one or more of an associated amplifier and analog to digital converter. Alternatively or additionally, the audio I/O interface 236 may be configured to separate audio information from a media stream provided to, or received by, the tag management server 132. This information may be separated in real-time, or as the information is received by the tag management server 132.

The video I/O interface 240 can be included to receive and transmit video signals between the various components in the system 100. Optionally, the video I/O interface 240 can operate with compressed and uncompressed video signals. The video I/O interface 240 can support high data rates associated with image capture devices. Additionally or alternatively, the video I/O interface 240 may convert analog video signals to digital signals. Similar to the audio I/O interface 236, the video I/O interface 240 may be configured to separate video information from a media stream provided to, or received by, the tag management server 132.

Figure 3:
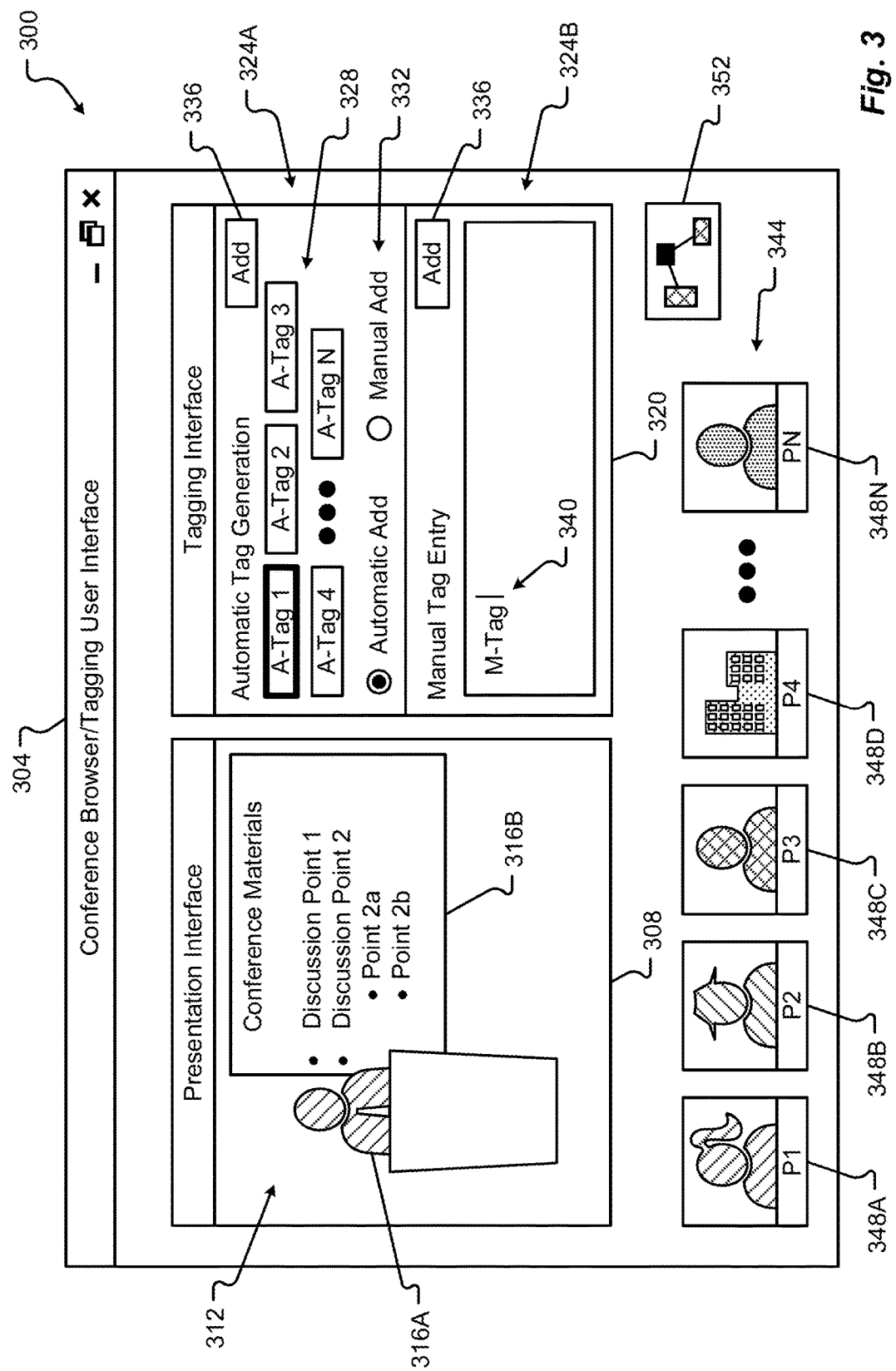
FIG. 3 is a block diagram depicting an information tagging user interface in accordance with at least some embodiments of the present disclosure.

FIG. 3 is a block diagram depicting an information tagging user interface 300 in accordance with at least some embodiments of the present disclosure. The user interface 300 may include a window 304 that can be presented to a display of a communication device 108 or server 112. The window 304 may include identification information, application controls, and at least one viewing area. The viewing area of the window 304 may be separated into a number of different areas 308, 320, 344. In particular, the window 304 may include a presentation interface area 308, a tagging interface area 320, and a participant viewing area 344.

The presentation interface area 308 may include a display area 312. The display area 312 may be configured to present information pertinent to the conference, participants, files, documents, etc. The display area 312 may show recorded, live, or other presentations and/or video streams. As shown in FIG. 3, the display area 312 includes a video stream with an image of a presenter 316A and a displayed presentation 316B (e.g., an electronic presentation, slides, overhead projected images, etc.). In some embodiments, the display area 312 may show the presenter 316A alone, the presentation 316B alone, or both the presenter 316A and the presentation 316B together simultaneously. In one embodiment, a display of the particular information shown in the display area 312 may be selectively controlled automatically, or via a host or moderator of the conference. In the case of certain presentations and/or conferences (e.g., prerecorded, webinars, buffered presentations, etc.), the presentation interface area 308 may include playback controls, audio controls, video controls, and/or other content controls.

The tagging interface area 320 may provide a user interface to at least one of view, search, add, and/or control the addition of generated tags. The tagging interface area 320 may include an automatic tag generation area 324A and a manual tag entry area 324B. The automatic tag generation area 324A may correspond to an area where automatically generated tags can be viewed, endorsed, and/or selected. This area 324A may display tags that automatically generated by the tag management server 132 and/or tag application module 124. The automatically generated tags (e.g., A-Tag 1, A-Tag 2, etc.) may be dynamically displayed to a portion 328 of the automatic tag generation area 324A. For instance, the tags may be generated and displayed as the presentation or conference is running. These displayed tags may be relevant to a time, topic, or other object associated with the presentation or conference as the conference is playing. As can be appreciated, a particular automatically generated tag may be removed from the portion 328 when that particular tag has been added (e.g., added to the conference information, a tag memory, and/or otherwise associated with the conference, an object of the conference, etc.). In some embodiments, a particular automatically generated tag (e.g., A-Tag 1, etc.) may be highlighted, or otherwise identified, as being added. As shown in FIG. 3, this identification is shown by a thicker border surrounding displayed tag "A-Tag 1."

In one embodiment, automatically generated tags may be presented to the automatic tag generation area 324A for selection, endorsement, or verification by a user of, viewer of, or participant to, the conference. A functionality allowing user-selection/user-endorsement of automatically generated tags may be controlled via one or more radio buttons or switches 332. Additionally or alternatively, the functionality (e.g., or access to these switches, etc.) may be controlled by a host, moderator, or conference administrator. When the "Manual Add" radio button or switch is selected, a user may select one or more tags from the displayed automatically generated tags in the portion 328 to associate the selected tags with the conference or object information. In one embodiment, once one or more tags are selected a user may click or select the "Add" button 336 to add the tag.

The manual tag entry area 324B may provide an area where users, viewers, moderators, etc. can manually add tags to be associated with the conference or other object. The methods and systems described herein may utilize a combination of manually added and automatically added tags to determine whether a tag should be expanded to include addition tags or information. The manual tag entry area 324B shown in FIG. 3 includes a character entry area 340. The character entry area 340 may be used to enter words, phrases, names, characters, symbols, and/or other tags. In some cases, a user may enter multiple tags via the character entry area 340. Multiple entries may be delimited with one or more characters, symbols, etc. Once at least one manual tag is entered into the character entry area 340 a user may click or select the "Add" button 336 to add the tag.

The tagging user interface 300 may include a participant, host, moderator, viewer, and/or invited user area 344. This area 344 may include one or more icons 348A-N including, but in no way limited to, symbols, video images, photographs, live video feeds, and/or avatars associated with one or more participants in the conference. As shown in FIG. 3, users P1-PN 348A-348N are shown as associated with or included in the conference. In some cases, an icon 348D may represent an entity, group, or organization other than an individual that is included in or associated with the conference. In some embodiments, the user area 344 may dynamically change to include more or fewer participants as a group changes or a conference progresses, etc.

The user interface 300 may include one or more view switching buttons. For instance, FIG. 3 shows a view switching button 352 that allows a user to selectively navigate between the tagging user interface and a tag network viewing interface. The tag network viewing interface is described in greater detail in conjunction with FIG. 6.

Figure 4:
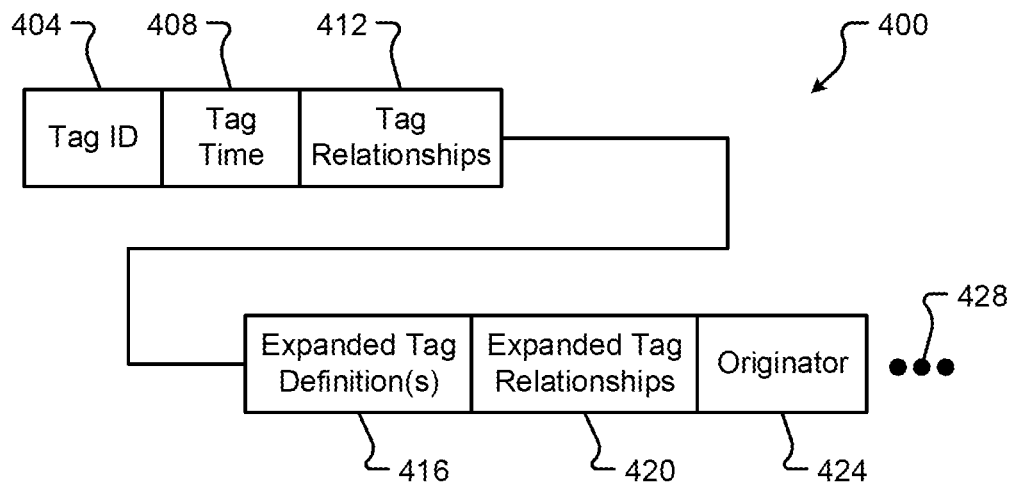
FIG. 4 is a block diagram depicting an information tag data structure used in accordance with at least some embodiments of the present disclosure.

FIG. 4 is a block diagram depicting an information tag data structure 400 used in accordance with at least some embodiments of the present disclosure. The data structure 400 may include a number of fields that may be used in the processes outlined herein. For instance, it is anticipated that the data structure 400 shown may be associated with one or more automatic expansion and derivative tagging method performed by at least one server 112, 132. In particular, the data structure 400 depicted includes a plurality of data fields that contribute, at least in part, to the process of automatic tag expansion. Examples of such data fields include, without limitation, a tag identification ("ID") field 404, a tag time field 408, a tag relationships field 412, an expanded tag definitions field 416, an expanded tag relationships field 420, an originator field 424, and more 428.

The tag ID field 404 may comprise data used to identify or describe a generated tag. This identification may be a name, phrase, word, symbol, number, character, and/or combination thereof. In some embodiments, the tag ID may correspond to a particular tag word or phrase that is generated automatically or manually. For instance, a conference may be conducted regarding the rollout of "Product X." In this example, the tag phrase "Product X" may be generated automatically (e.g., based on speech recognition, context information, etc.) or manually (e.g., entered by a user, etc.) and the tag ID field 404 may contain the actual tag phrase "Project X." In some embodiments, the tag ID field 404 may be used to order a tag in relation to other tags generated. In this case, the tag ID field 404 may comprise an incremented order value associated with the tags. For example, the third tag generated in a "Weekly Update" conference moderated by "User A" may be stored or identified as "WU UA 0003," where details regarding the conference may make up a portion (e.g., a prefix, etc.) of the tag ID (e.g., "Weekly Update" being represented by "WU," and "User A" being represented by "UA," etc.). The incremental value may be represented by another portion of the tag ID (e.g., "0003," etc.). Continuing this example, the next sequential tag may be represented by the incremented tag ID of "WU UA 0004."

The tag time field 408 may comprise data used to identify a time associated with a generated tag. This time may include, but is no way limited to, a time when the tag was generated, a time in a conference when the tag was generated, a time relevant to the tag in the conference, and/or combinations thereof. For instance, a tag generated at a particular time of a conference may be used to identify a point in time that the tag was first relevant. By way of example, a webinar may be conducted where a presenter first discusses "Hardware Elements" of a particular product two minutes into the conference. In this example, the tag "Hardware Elements" may be associated with the tag time of "two minutes" or "00:02:00." Among other benefits, providing this time allows a user to search for the tag and retrieve content that pertinent to the time and the tag.

The tag relationships field 412 may comprise data used to identify relationships between tags and objects or other tags. As described above, objects may include users, events, products, people, timing, locations, phrases, organizations, etc. Relationships may be used to construct tag networks and/or graphical representations of links between tags and/or objects.

The expanded tag definitions field 416 may comprise data used in expanding tags identified in the tag ID field 404. As described herein, tags may be expanded based on relationships, rules, analytics, and/or in accordance with various expansion ontologies. The expanded tag definitions field 416 may comprise pointers to expansion rules, expanded tag information, links to other tags, and/or the like.

The expanded tag relationships field 420 may comprise data used to expand relationships associated with a particular tag. For instance, a user may wish to view relationships of the tag identified in the tag ID field 404. However, the relationships defined by the tag relationships of field 412 may be narrowly tailored to the precise terminology and/or context of the tag contained in the tag ID field 404. In this example, the user may expand relationships for viewing (e.g., in a tag network viewer, etc.) using the expanded tag relationships information in the expanded tag relationships field 420. As described herein the expanded tag relationships field 420 may be based on the tag ID and the expanded tag definitions in field 416. For example, a tag in the tag ID field 404 may correspond to the "Product X Rollout." During expansion, the expanded tag definitions may include other products that are rolled out with "Product X" (e.g., "Product Y" and "Product Z"). As such, the expanded tag relationships in field 420 would yield different, and expanded, connections and links between tags and/or objects including the additional products (e.g., especially in the tag network view, etc.).

The originator field 424 may comprise data used to identify an originator of a tag. The originator may be an individual, a group, or a server. For instance, in the case of automatically generated tags, the originator field 424 may indicate "AUTO" or some other data to identify that the originator of the tag is a machine. This information may be used to evaluate, classify, and/or otherwise organize generated tags. Among other things, tags can be organized based on the originator of the tag.

Figure 5:
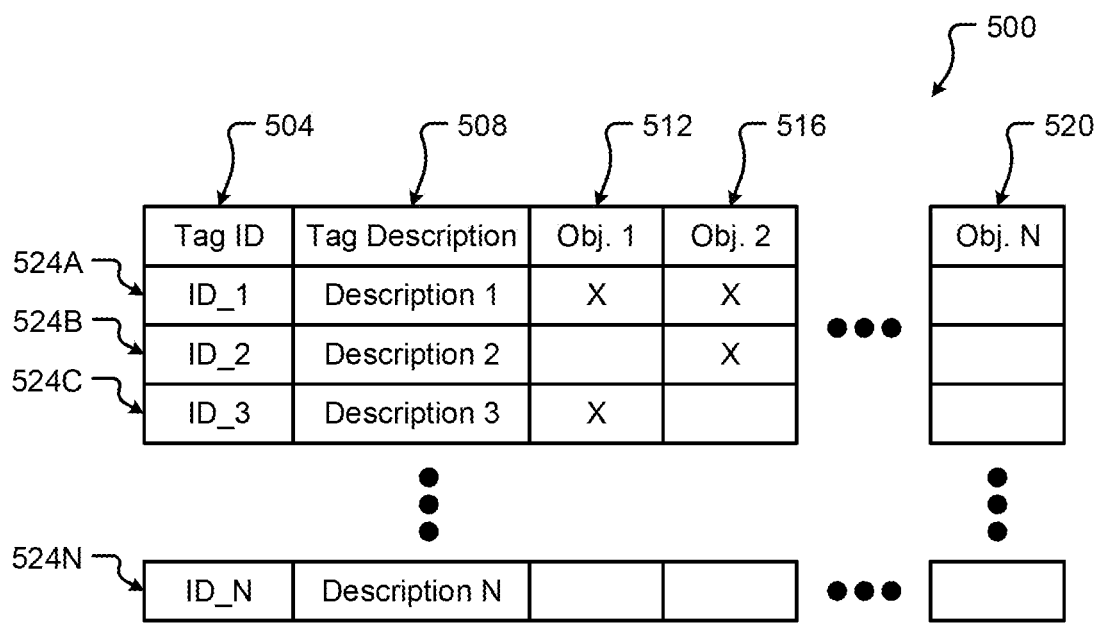
FIG. 5 is a block diagram depicting a tag relationship data structure used in accordance with at least some embodiments of the present disclosure.

FIG. 5 is a block diagram depicting a tag relationship data structure 500 used in accordance with at least some embodiments of the present disclosure. As shown, the data structure 500 is presented in the form of a table that contains several fields that may be used in the various processes outlined herein. For instance, it is anticipated that the data structure 500 shown may be associated with one or more automatic expansion and derivative tagging method performed by at least one server 112, 132. In particular, the data structure 500 depicted includes a plurality of data fields that contribute, at least in part, to the process of automatic tag expansion. Examples of such data fields include, without limitation, tag identification ("ID") fields 504, tag description fields 508, first object relationship fields 512, second object relationship fields 516, and additional object relationship fields 520. Each tag generated may include entries associated with one or more fields 504-520 in a specific row 524A-N. For instance, tag ID "ID_1" may include a description of the tag in the tag description field 508 associated with the first row 524A (e.g., "Description 1").

In some embodiments, the tag may be associated with one or more objects (e.g., identified in fields 512-520). As described above, the object may be a particular conference, user, product, event, time, location, phrase, etc. In FIG. 5, tags "ID_1" and "ID_2" have "Obj. 2" in common, while tags "ID_1" and "ID_3" have "Obj. 1" in common. Among other things, this information may be used to determine tag networks, links between tags, links between objects, and graphically render the same, for example, via a tag network viewer to a display of a communication device 108 or server 112, 132.

Figure 6:
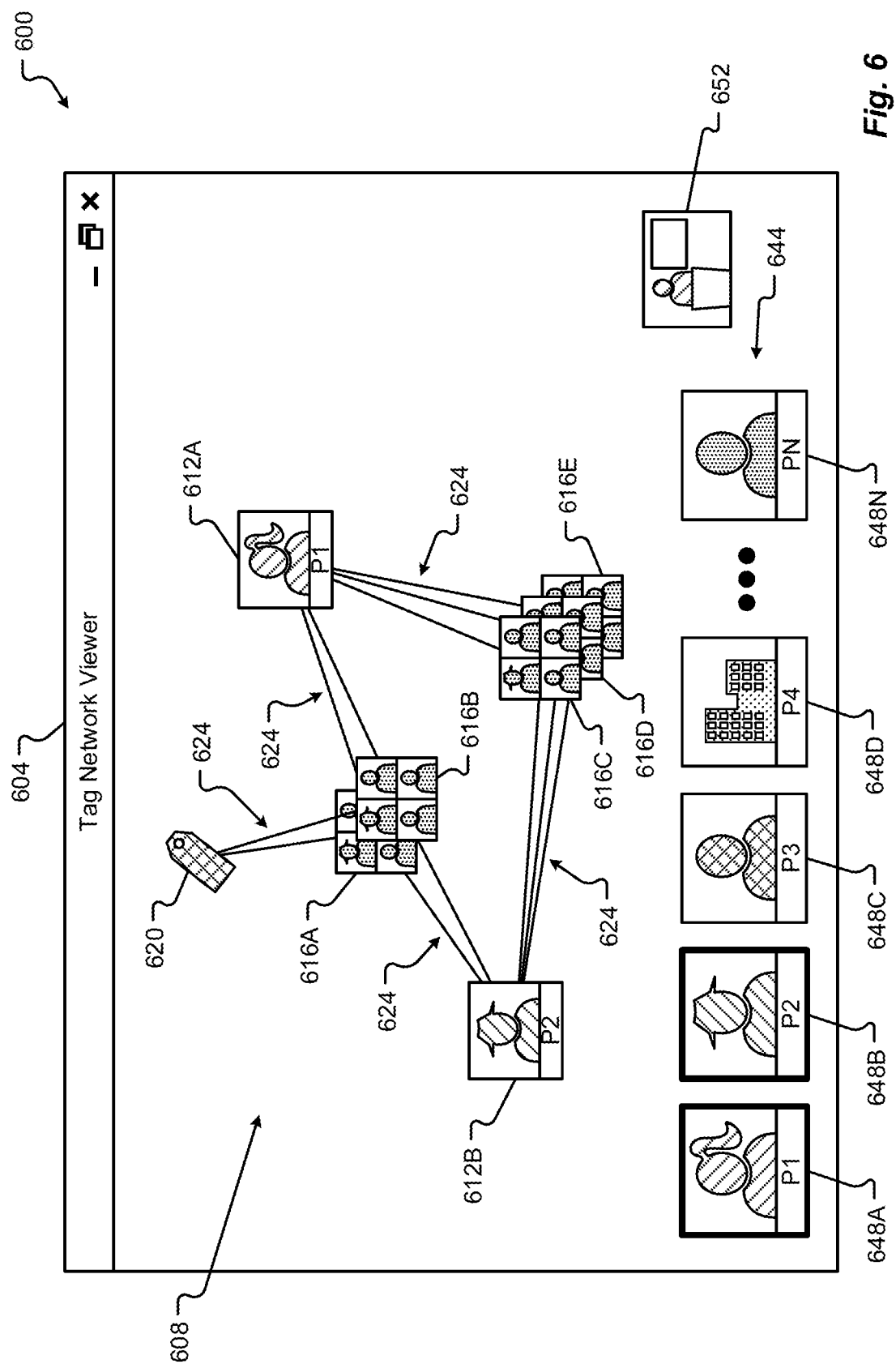
FIG. 6 is a block diagram depicting a tag network user interface in accordance with at least some embodiments of the present disclosure.

FIG. 6 is a block diagram depicting a tag network user interface 600 in accordance with at least some embodiments of the present disclosure. The user interface 600 may include a window 604 that can be presented to a display of a communication device 108 or server 112, 132. The window 604 may include identification information, application controls, and at least one viewing area. The viewing area of the window 604 may be separated into a number of different areas 608, 644. In particular, the window 604 may include a tag network viewing area 608 and a participant viewing area 644. The participant viewing area 644 and the contents of the viewing area 644 may be similar, if not identical, to the participant viewing area 344 described in conjunction with FIG. 3.

The tag network viewing area 608 may include a display area configured to present information pertinent to one or more connections between tags, objects, and/or other conference information. The tag network viewing area 608 may include a number of tags or objects represented as graphical nodes 612A, 612B, 616A-E, 620. In some embodiments, one or more of the nodes 612A, 612B, 616A-E, 620 may be connected by links 624. The link 624 may indicate that at least one tag or object is shared between select nodes 612A, 612B, 616A-E, 620. As can be appreciated, the number of links 624 shared among nodes 612A, 612B, 616A-E, 620 to objects or tags indicates a greater connection, relationship, or motivation between the nodes 612A, 612B, 616A-E, 620.

As shown in the tag network viewing area 608, a first user 612A has a connection to a first and second conference 616A, 616B. This connection is illustrated via links 624 connecting the first user 612A node to the conference nodes 616A, 616B. Also shown in FIG. 6 is a connection between the first user 612A and the conferences 616C-E. From the graphical representation shown in FIG. 6, it is clear that a second user 612B has connections to the same conferences 616A-E as the first user 612A. The methods and systems described herein may provide additional connections, or related connections, based on an automatic expansion of tags generated. For instance, the methods and systems may determine through expanding the tags generated in first and second conferences 616A, 616B that a common node 620 (e.g., a topic, product, and/or other object) exists between the first and second user 612A, 612B. Among other things, the methods and systems described herein offer the benefit of quickly identifying links between one or more objects and/or tags, especially those links that may not otherwise be determined. For instance, while the first and second users 612A, 612B do not have a direct connection to node 620, the first and second users 612A, 612B are indirectly connected to the node 620 based on their connection to conference nodes 616A, 616B.

As can be appreciated, displayed information may be filtered, refined, or even further expanded, by selecting one or more nodes 612A, 612B, 616A-E, 620, including users 612A, 612B, search terms, tags, etc. In FIG. 6, the first and second users 612A, 612B, are shown as being selected by having a thicker border surrounding the representative images 648A, 648B of the first and second users 612A, 612B when compared to the other images 648C-N.

The user interface 600 may include one or more view switching buttons. These viewing buttons may be similar, if not identical, to the switching buttons described in conjunction with FIG. 3. Similar to view switching button 352, switching button 652 may allow a user to selectively navigate between the tag network viewing interface 600 and the tagging user interface 300.

Figure 7:
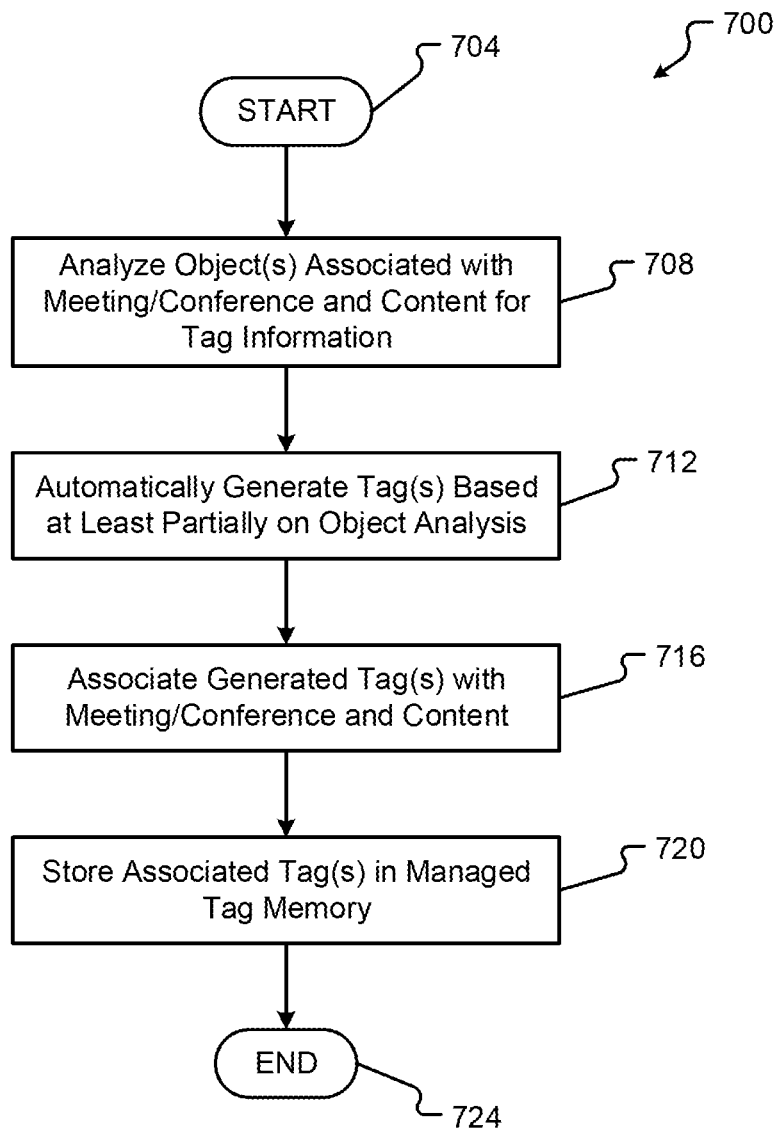
FIG. 7 is a flow diagram depicting a method of automatically generating tags in accordance with at least some embodiments of the present disclosure.

With reference to FIG. 7, a method 700 of automatically generating tags will be described in accordance with at least some embodiments of the present disclosure. The method 700 begins at step 704 and proceeds by analyzing objects associated with a conference for tag information (step 708). The analysis of objects may include analyzing a content of the objects associated with the conference. For instance, the conference may include audio and/or video content. This content may be analyzed, for example via the tag management server 132, tag application module 124, and/or combinations thereof. In one example, the analysis may include utilizing speech recognition mechanisms (e.g., via the speech recognition engine 216 of the server 132, etc.) to determine a content of the audio stream. These speech recognition mechanisms may determine trends or frequencies in spoken content, match spoken content to stored keywords, match spoken content to other tags, etc. Other information analyzed may include object information such as participant information, meeting information, conference information, invitation content, and/or other contextually relevant data. In some embodiments, this analysis may be performed via the tag generation module 208 and/or the tag context module 212 of the tag management server 132.

The method 700 continues by automatically generating one or more tags based on the analysis performed in step 708 (step 712). The tags may be generated in a particular format, for example, as described in conjunction with FIGS. 4 and 5. This format may include associating the generated tags with conference and/or other content (step 716). In one embodiment, the association may include storing the tag with the conference information. In some embodiments, the association may include storing the association in the tag itself. The method 700 may then store the associated tags in a managed tag memory 140. In any event, the method 700 ends at step 724.

Figure 8:
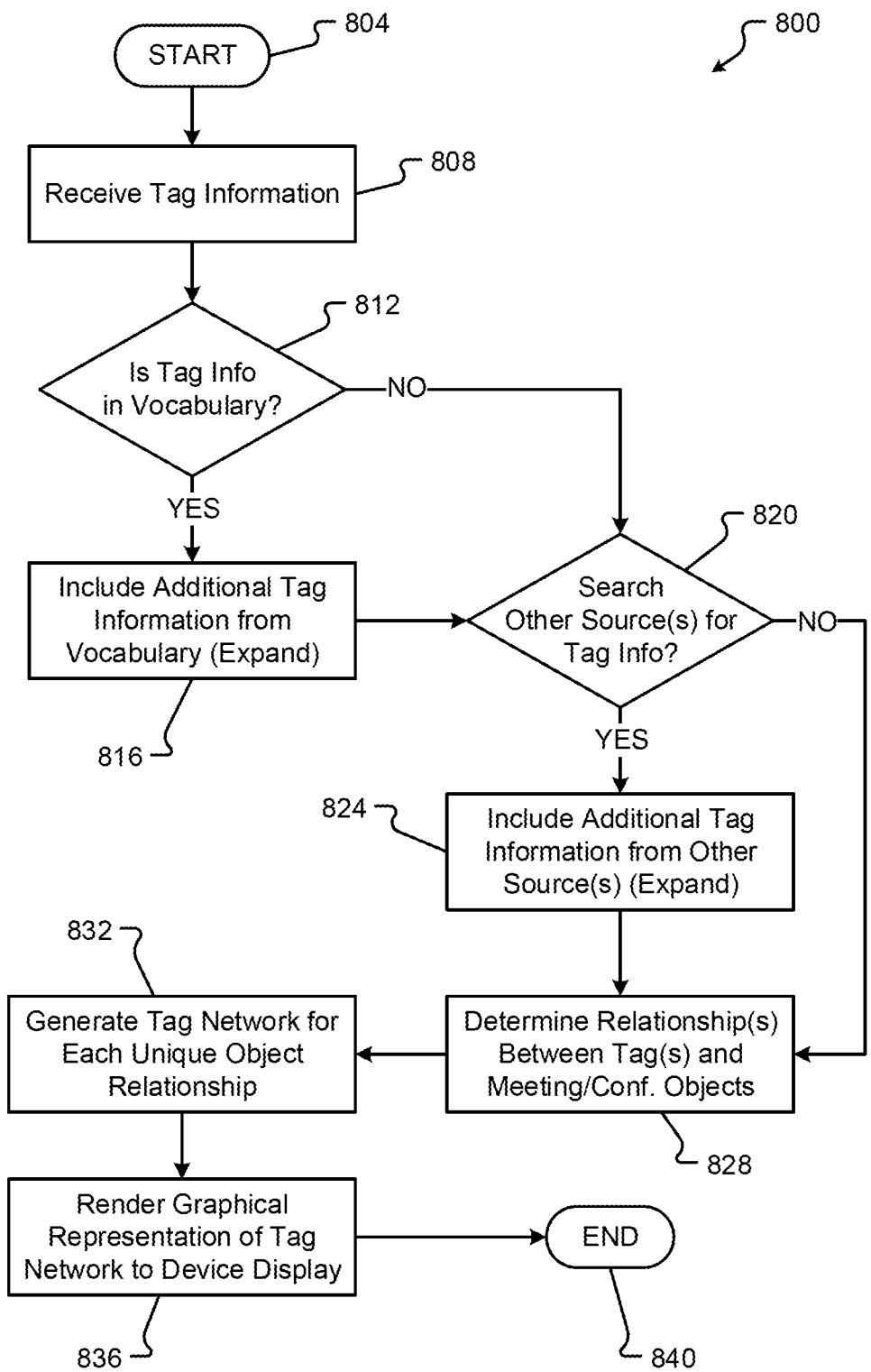
FIG. 8 is a flow diagram depicting a first method of expanding tags associated with communication information in accordance with at least some embodiments of the present disclosure.

FIG. 8 depicts a first method 800 of expanding tags associated with communication information in accordance with at least some embodiments of the present disclosure. The method 800 begins at step 804 and proceeds by receiving tag information (step 808). In some embodiments the tag information may be automatically and/or manually generated. In one embodiment, the method 800 may receive tag information as it is generated, or in real-time. In other embodiments, the tag information may be received in non-real-time, for example, at the conclusion of a conference.

Once the tag information is received, the method 800 may proceed by determining whether any tag information is included in a tag vocabulary (step 812). For instance, a tag management server 132 may refer to a tag vocabulary memory 136 to compare information about the received tag to stored information for expanding the tag information using language expansion. Language expansion and tag vocabulary may include terms that are known to expand or relate to specific tags or keywords. For instance, the phrase "heart attack" may be expanded via use of the tag vocabulary to include the tags or information "cardiac arrest," "emergency," "cardiopulmonary," "blood," and/or the like. Among other things, this tag expansion may account for colloquial or regional terms and phrases and allow similar, if not identical, tags to be included for further search, archival, and/or retrieval. For example, a tag of "emergency" or "999" in England may be expanded to include emergency numbers "911" in North America, "112" in parts of Europe, and/or "000" in Australia, etc.

In the event that tag information is included in the vocabulary, the method 800 may continue by including the additional, or expanded, tag information with the tag (step 816). Otherwise the method 800 continues at step 820. In one embodiment, including the additional, or expanded, tag information may correspond to linking the expanded tag information to the received tag. In another embodiment, the additional or expanded tag information may be added to the tag itself or a portion thereof. For instance, a data structure representing the tag may include one or more expanded definition fields. Expanded definition fields are described in conjunction with FIG. 4.

Next, the method 800 may determine whether one or more other sources should be searched and/or accessed to expand a tag (step 820). In some cases, the analysis of a tag or an object associated with the tag may provide information that can be used to expand the tag. For example, a tag may be associated with a particular object in an organization. However, the tag may include little or no information regarding details of the particular object. In this example, the method 800 may refer to one or more organizational-external or organization-internal sources 144, 152 to retrieve expanded tag information. If the object is a user, the tag management server 132 may access information from a personnel database in an organization-internal source, or social media data from an organizational-external source. This information may include the user's full name, interests, location, picture, etc. If the object defines a location such as "Pensacola," the tag management server 132 may access a map service or organizational-external source to expand the location to "Florida." In any event, the method 800 may continue by expanding the tags via inclusion or association (step 824). In one embodiment, including the additional, or expanded, tag information may correspond to linking the expanded tag information to the received tag. In another embodiment, the additional or expanded tag information may be added to the tag itself or a portion thereof. For instance, a data structure representing the tag may include one or more expanded definition fields. Expanded definition fields are described in conjunction with FIG. 4.

The method 800 may proceed by determining relationships between the tags and/or objects (step 828). These relationships may be based on connections between tags and objects, associated tags and objects, and/or indirect associations. In some embodiments, the tag information and/or the object information may be analyzed to determine common connections between the various tag and object information. Once the relationships are determined, the method 800 may generate a tag network that graphically illustrates the relationship of the tags to one another or to objects (step 832). This information may be rendered to a device display in a similar manner described in conjunction with FIG. 6 (step 836). The method 800 ends at step 840.

Figure 9:
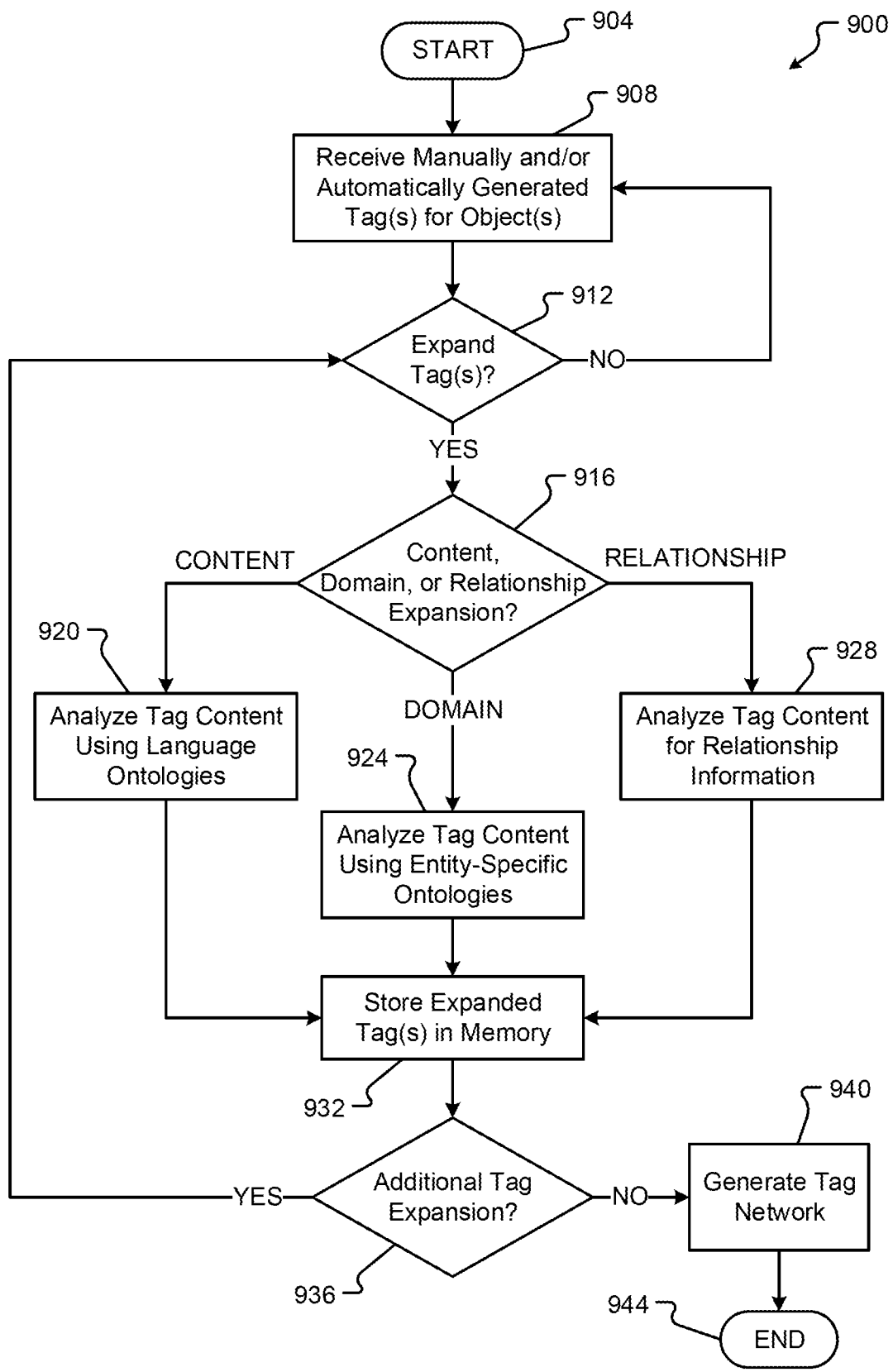
FIG. 9 is a flow diagram depicting a second method of expanding tags associated with communication information in accordance with at least some embodiments of the present disclosure.

With reference now to FIG. 9, another method 900 of expanding tags associated with communication information will be described in accordance with at least some embodiments of the present disclosure. The method begins at step 904 and proceeds by receiving one or more manually and/or automatically generated tags for objects (step 908). In some embodiments, the tags may be received in real-time, for example, as the tags are generated. The method 900 continues by determining whether the tags should be expanded to include additional information (step 912). If not, the method 900 may end or return to step 908.

In the event that the tags are determined to be expanded, the method 900 may continue by determining a particular expansion method and/or ontology by which to expand the tags (step 916). Although three different expansion methods or ontologies are shown in FIG. 9, it should be appreciated that expanding tags may include any number tag expansion methods, ontologies, or combinations thereof. For instance, the tag expansion method 900 may employ any number of ontologies, content analysis, and/or recursive expansion processes as described herein.

A first expansion ontology may include a content-based expansion of the received tags. Using this ontology, the method 900 proceeds by analyzing the content of the tag for any expansion based on the language of the tag (step 920). For instance, the tag may include words or phrases that can be analyzed for commonly-used components or combinations. Analysis of commonly-used components can include modifying the tense, prefix (e.g., via addition or subtraction), suffix (e.g., via addition or subtraction), arrangement (e.g., breaking compound words into structural root words, making compound words, etc.), and/or combinations thereof associated with the tag words or phrases. Additionally or alternatively, the analysis may include adding words or phrases that historically or typically occur in conjunction with the tag. By way of example, a tag labeled "politics" may be expanded to include "political," "politician," "election," "November," etc.

Another expansion ontology may include a domain, company, or entity-specific based expansion of the received tags. Using the entity-specific ontology, the method 900 may proceed by analyzing the tag in view of company or entity-specific word or phrase relationships (step 924). For example, the tag may include words or phrases that can be analyzed for commonly-used components or combinations specific to an entity, company, group, or organization. In one embodiment, these commonly-used words or phrases may be maintained in a company relational database or memory. As an example, a portion of a conversation may be tagged with the phrase "Product X Release Event." In this case, the tag may be expanded to include a general description of the product, related products, timing, location, and/or other similarly expanded tags. Examples of expanded tags using this ontology may include, but are in no way limited to, "Product Y," "Public Release," "Autumn," and "Ireland" to name a few. In any event, the expansion of the tags using this ontology may utilize a company-specific (e.g., non-public) set of related words, terms, and/or phrases.

Yet another expansion ontology may include a company and/or domain structure that is used in conjunction with relationship information to expand one or more received tags. Using the relationship ontology, the method 900 may proceed by analyzing the tag in view of company or entity-specific relationships (step 928). For instance, a tag may include words or phrases that can be analyzed for participants, groups, or roles that are specific to a company or domain. In one embodiment, these relationships may be maintained in a company relational database or memory. As an example, a portion of a conversation may be tagged with the phrase "Summer Marketing Meeting." In this case, the tag may be expanded to include one or more individuals in a marketing group, a sales group, invited participants, timing and/or other similarly expanded tags. Examples of expanded tags using this ontology may include, but are in no way limited to, "Sales Group," "Marketing Group," "Lake Tahoe," "team building," and/or the like. In any event, the expansion of the tags using this ontology may utilize a company-specific (e.g., non-public) set of related groups, users, words, terms, and/or phrases.

As provided above, and in conjunction with FIG. 8, an expansion ontology may include a location expansion ontology and/or other expansions with structure. For example, if a tag includes reference, connection, or other association with a location, the method 900 may continue at step 916 by determining to apply a location expansion ontology. It should be appreciated that the location, or other structured, expansion ontology may be a part of the content-based or other ontology described herein. In some embodiments, the location, or other structured, expansion ontology may be separate from the other ontologies described in conjunction with FIG. 9. In any event, it is an aspect of the present disclosure that a location expansion ontology may consider location information in expanding tags that are geographically, temporally, or otherwise spatially located to the location information associated with a tag.

Once a particular ontology, or group of ontologies, is applied to the tag during an analysis, the method 900 may continue by storing the expanded tags in memory (step 932). The expanded tags may be stored in a tag memory, in a portion of a tag data structure, and/or associated with an object. The method 900 may continue by determining whether to perform an additional tag expansion, for example, using an alternative ontology or method (step 936). In some embodiments, the additional tag expansion may be part of a recursive, or repetitive, tag expansion. For example, in one embodiment a recursive or repetitive tag expansion may include expanding previously generated tags or first expanded tags generated in a first tag expansion to generate another iteration of expanded tags or second expanded tags generated in a second tag expansion and/or so on. By way of example, a mention of "car" may be first expanded to include one or more expanded tags such as "engine," "doors," "windshield," "tires," "oil," "gas," etc. The method 900 may continue by performing another iterative round of expansion to expand the first expanded tags to additionally include second derivative items like "gas station," "auto glass repair," "tire stores," etc. This repetitive and/or recursive tag expansion may be performed any number of times, or iterations, to further broaden or expand one or more tags or previously expanded tags. If an additional tag expansion method is to be performed, the method 900 repeats after step 912. Otherwise, the method 900 may proceed to generate a tag network using the tag and/or expanded tag information (step 940). The tag network may describe relationships between tags, objects, and/or other conference information. One example of a tag network is illustrated in conjunction with FIG. 6.

Any of the steps, functions, and operations discussed herein can be performed continuously and automatically.

The exemplary systems and methods of this disclosure have been described in relation to conferences and communication systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

What is claimed is:

1. A communication system, comprising:
   a server, comprising:
     a microprocessor;
     a computer readable medium, coupled to the microprocessor and comprising instructions stored thereon that cause the microprocessor to:
       determine that a tag is associated with digital media content;
       determine a definition of the tag comprising a type and meaning of the tag;
       receive a repository of expanded tag definitions from a tag expansion data source via a database interface that is communicatively coupled with the server;
       select, from the repository of expanded tag definitions and using the definition of the tag, an expanded tag definition for the tag comprising information for expanding search criteria related to the tag or the digital media content, wherein the tag expansion data source is an organization-internal data source owned and managed by an organization providing the digital media content and comprises private data that is unavailable to entities outside of the organization; and
       associating the expanded tag definition with the tag and the digital media content.

2. The communication system of claim 1, wherein the tag identifies information relevant to the digital media content at particular time of the digital media content.

3. The communication system of claim 1, wherein the tag expansion data source is one or more of an organization-specific member list, an organization-specific email client, an organization-specific calendar, or a private vocabulary repository hosted by the organization.

4. A method, comprising:
   receiving, at a processor, a tag associated with digital media content;
   determining, via the processor, a definition of the tag comprising a type and meaning of the tag;
   selecting, via the processor and using the definition of the tag, an expanded tag definition for the tag from a repository of expanded tag definitions, wherein prior to selecting the expanded tag definition, the expanded tag definitions are received from a tag expansion data source across a communication network, wherein the tag expansion data source is an organization-internal data source owned and managed by an organization providing the digital media content and comprises private data that is unavailable to entities outside of the organization, wherein the expanded tag definition comprises at least one expanded tag, and wherein the expanded tag definition comprises information for expanding search criteria related to the tag or the digital media content; and
   associating, via the processor, the expanded tag definition with one or more of the tag or the digital media content.

5. The method of claim 4, wherein the tag identifies information relevant to the digital media content at particular time of the digital media content.

6. The method of claim 4, further comprising:
   determining, via the processor, to further expand the tag by expanding the expanded tag definition;
   selecting, via the processor and using the expanded tag definition, a derivative expanded tag definition for the expanded tag definition from the repository of expanded tag definitions, wherein the derivative expanded tag definition comprises information for expanding search criteria related to one or more of the tag, the expanded tag definition, or the digital media content; and associating, via the processor, the derivative expanded tag definition with one or more of the tag, the expanded tag definition, or the digital media content.

7. The method of claim 4, further comprising:
generating, via the processor, a tag network based on the tag and the expanded tag, wherein the tag network defines a relationship between the tag, the expanded tag, and one or more of other tags, the digital media content, or other digital media content, and wherein the tag network is configured for rendering as a graphical user interface to a display of a communication device.

8. The method of claim 7, wherein the graphical user interface presents the relationship between the tag, the expanded tag, and one or more of other tags, the digital media content, or other digital media content as one or more graphical links between nodes.

9. The method of claim 4, wherein the tag expansion data source is one or more of an organization-specific member list, an organization-specific email client, an organization-specific calendar, or a private vocabulary repository hosted by the organization.

10. A server, comprising:
a processor; and
a computer-readable medium, coupled with the processor, the computer-readable medium comprising instruction sets that are executable by the processor, wherein the instruction sets cause the processor to:
analyze digital media content for tag information;
determine a tag is generated for a portion of the digital media content, wherein the tag comprises information relevant to a recorded content time of the digital media content;
automatically determine a definition of the tag, wherein the definition comprises a type and meaning of the tag;
receive a repository of expanded tag definitions from an expanded tag data source, via a database interface, that is communicatively coupled with the server, wherein the expanded tag data source is an organization-internal data source owned and managed by an organization providing the digital media content and comprises private data that is unavailable to entities outside of the organization;
select, automatically from a set of expanded tags received from the expanded tag data source and using the definition of the tag, an expanded tag comprising an expanded definition for the tag, wherein the expanded tag definition comprises information for expanding search criteria related to the tag or the digital media content; and associate the expanded tag with the tag and the digital media content by storing the expanded tag, a representation of the expanded tag, and/or a pointer to the expanded tag with the tag and the digital media content.

11. The server of claim 10, wherein automatically determining the definition of the tag further causes the processor to:
select a particular expansion ontology from a group of expansion ontologies stored in a memory, wherein the group of expansion ontologies comprises two or more of a content-based ontology, an entity-specific ontology, or a domain structure ontology, wherein the content-based ontology comprises instruction sets that cause the processor to access a stored vocabulary database of commonly-used words associated with the tag, wherein the entity-specific ontology comprises instruction sets that cause the processor to access a stored entity-specific relational database of commonly-used words that are associated with the tag and related to a particular entity or company, wherein the domain structure ontology comprises instruction sets that cause the processor to access a stored domain relationship structure ontology database of words that define relationships between entities in a private domain and the tag;
analyze information about the tag based on the selected expansion ontology; and
generate the type and meaning of the tag based on the analysis of the information about the tag.

12. The server of claim 10, wherein the expanded tag data source is one or more of a social network site, a search engine site, a geographical map site, or a public website.

13. The server of claim 10, wherein the tag identifies information relevant to the digital media content at particular time of the digital media content.

14. The server of claim 10, wherein the expanded tag definition is a location tag for accessing a map provider to provide a location context.

15. The server of claim 14, wherein the location context identifies a local service and a state of the local service.

16. The server of claim 10, wherein the expanded tag definition is a language tag that relates to the tag.

17. The communication system of claim 1, wherein the expanded tag definition is a location tag for accessing a map provider to provide a location context.

18. The communication system of claim 17, wherein the location context identifies a local service and a state of the local service.

19. The communication system of claim 1, wherein the expanded tag definition is a language tag that relates to the tag.

20. The method of claim 4, wherein the expanded tag definition is a location tag for accessing a map provider to provide a location context.

* * * * *